United States Patent
Kato et al.

(10) Patent No.: US 8,628,112 B2
(45) Date of Patent: Jan. 14, 2014

(54) CURTAIN AIR BAG SYSTEM

(75) Inventors: Hideki Kato, Nissin (JP); Yosuke Shimizu, Toyota (JP); Yuuki Nakamura, Kasumigaura (JP); Yutaka Nakajima, Tsukuba (JP)

(73) Assignees: Toyota Jidosha Kabushiki Kaisha, Toyota-shi (JP); Autoliv Development AB, Vargarda (SE)

( * ) Notice: Subject to any disclaimer, the term of this patent is extended or adjusted under 35 U.S.C. 154(b) by 0 days.

(21) Appl. No.: 13/297,528

(22) Filed: Nov. 16, 2011

(65) Prior Publication Data

US 2012/0126517 A1 May 24, 2012

(30) Foreign Application Priority Data

Nov. 18, 2010 (JP) .................... 2010-258061

(51) Int. Cl.
*B60R 21/232* (2011.01)
(52) U.S. Cl.
USPC .................. 280/730.2; 280/743.1; 280/728.2
(58) Field of Classification Search
USPC ...................... 280/728.1, 728.2, 730.2, 743.1
See application file for complete search history.

(56) References Cited

U.S. PATENT DOCUMENTS

| | | | |
|---|---|---|---|
| 6,394,487 B1 * | 5/2002 | Heudorfer et al. | 280/729 |
| 7,775,553 B2 * | 8/2010 | Takemura et al. | 280/730.2 |
| 7,896,387 B2 * | 3/2011 | Ideue | 280/730.2 |
| 7,942,444 B2 * | 5/2011 | Steinbach et al. | 280/743.2 |
| 7,971,899 B2 * | 7/2011 | Abney et al. | 280/730.2 |
| 8,025,308 B2 * | 9/2011 | Fletcher et al. | 280/730.2 |
| 8,240,708 B2 * | 8/2012 | Fink et al. | 280/730.2 |
| 8,276,938 B2 * | 10/2012 | Yamamoto et al. | 280/730.2 |
| 2005/0189747 A1 * | 9/2005 | Khandhadia et al. | 280/730.2 |
| 2005/0206138 A1 * | 9/2005 | Breuninger et al. | 280/729 |
| 2008/0054606 A1 * | 3/2008 | Mitsuo et al. | 280/730.2 |
| 2009/0179405 A1 * | 7/2009 | Steinbach et al. | 280/730.2 |
| 2012/0025502 A1 * | 2/2012 | Matsushita et al. | 280/730.2 |
| 2012/0098240 A1 * | 4/2012 | Kato et al. | 280/730.2 |

FOREIGN PATENT DOCUMENTS

| | | |
|---|---|---|
| JP | 2001-171471 A | 6/2001 |
| JP | 2004189099 A | 7/2004 |
| JP | 2007-161163 A | 6/2007 |
| JP | 2007-161167 A | 6/2007 |
| JP | 2007-186192 A | 7/2007 |
| JP | 3966777 B | 8/2007 |
| JP | 2012062042 A | 3/2012 |
| JP | 2012062043 A | 3/2012 |

\* cited by examiner

*Primary Examiner* — Paul N Dickson
*Assistant Examiner* — Timothy Wilhelm
(74) *Attorney, Agent, or Firm* — Gifford, Krass, Sprinkle, Anderson & Citkowski, P.C.

(57) ABSTRACT

With the curtain air bag system according to this aspect, if the vehicle ends up rolling over, the main deployment portion receives a supply of gas and consequently inflates and deploys in a curtain shape. Also, the auxiliary deployment portion inflates and deploys by receiving a supply of gas from this main deployment portion via the gas passage. The head of an occupant seated in the front seat is protected against a rollover by the main deployment portion and the auxiliary deployment portion. Here, with the curtain air bag system described above, the upper end portion of the auxiliary deployment portion is connected to the front pillar via the connecting portion. Therefore, it is possible to prevent or effectively suppress the upper end of the auxiliary deployment portion from becoming offset in the vehicle width direction with respect to the front pillar when protecting the head of an occupant, which improves occupant head protection performance forward of the seat.

19 Claims, 5 Drawing Sheets

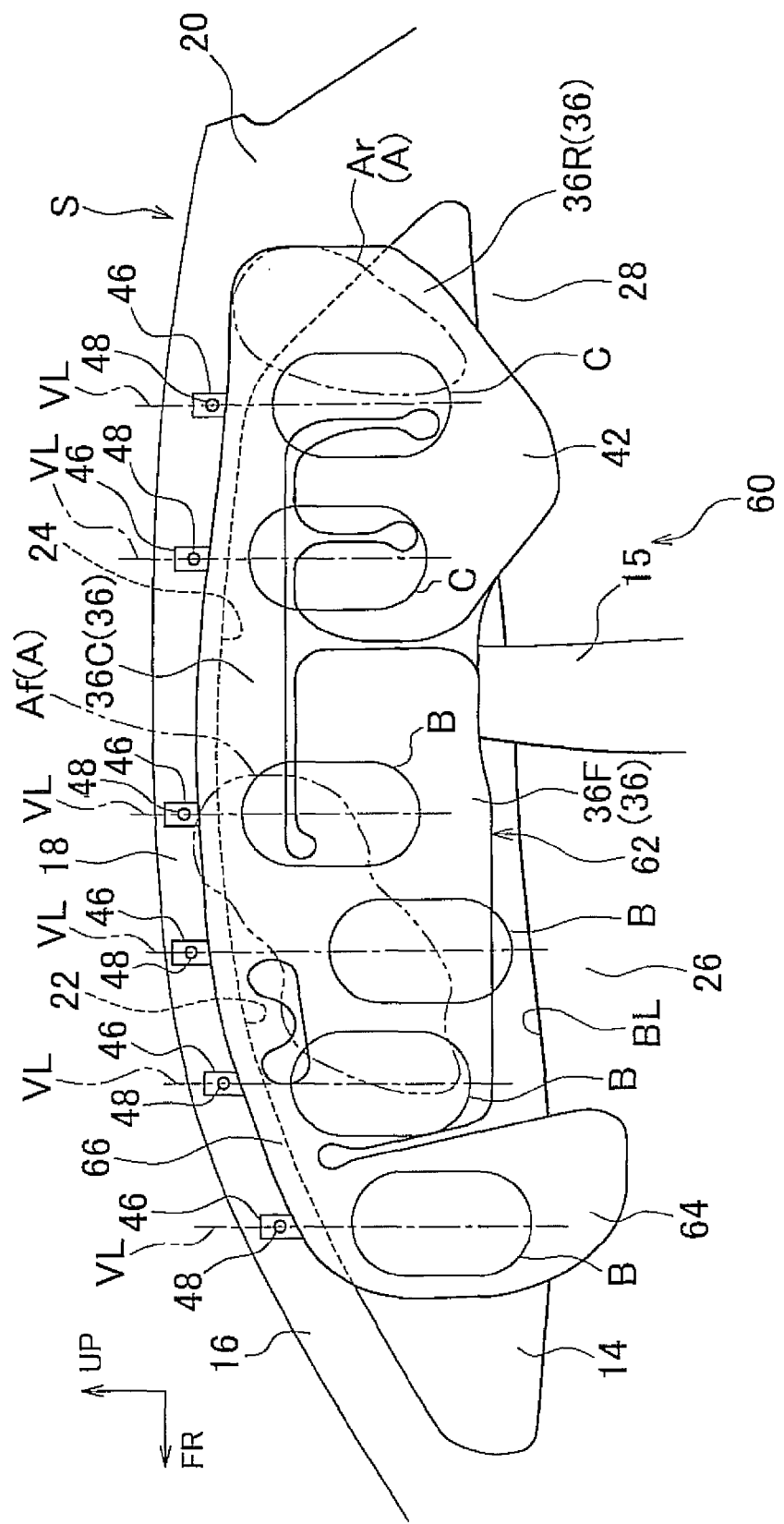

CURTAIN AIR BAG SYSTEM

CROSS-REFERENCE TO RELATED APPLICATIONS

This application claims the priority to Japanese Patent Application No. 2010-258061 filed on Nov. 18, 2010, which is incorporated herein by reference in its entirety including the specification, drawings and abstract.

BACKGROUND OF THE INVENTION

1. Field of the Invention

The invention relates to a curtain air bag system.

2. Description of Related Art

Japanese Patent Application Publication No. 2007-161163 (JP-A-2007-161163), for example, describes a curtain air bag system that includes a main inflating portion provided at an area where an occupant sits, and an auxiliary inflating portion provided in an area away from where the occupant sits. Also, Japanese Patent Application Publication No. 2007-161167 (JP-A-2007-161167), for example, describes technology in which, in a curtain air bag, an auxiliary deployment portion that extends down below a beltline is provided in an area aside from where an occupant sits.

However, the technologies described above do not take into account the positional relationship between the position where the curtain air bag is connected to the vehicle body, and the auxiliary inflating portion and the auxiliary deployment portion. Therefore, in the field of curtain airbags, there is room for improvement in view of head protection when a rollover occurs.

SUMMARY OF THE INVENTION

The invention provides a curtain air bag system capable of improving occupant protection performance when a vehicle rolls over.

A first aspect of the invention relates to a curtain air bag system. This curtain air bag system includes a main deployment portion for an occupant seated in a front seat, an auxiliary deployment portion, and a connecting portion. The main deployment portion is housed folded up in an upper edge portion of an opening for getting into and out of a vehicle in a vehicle body, and inflates by receiving a supply of gas when the vehicle is collided with in a side collision as well as when the vehicle rolls over, and deploys in a curtain shape downward with respect to the vehicle. The auxiliary deployment portion inflates by receiving a supply of gas via a gas passage that is communicated with a portion of the auxiliary deployment portion in a vertical direction of the vehicle, and deploys such that a lower end side, when viewed from a side, overlaps with a side door forward of the main deployment portion. The connecting portion connects a portion on an upper end side of the auxiliary deployment portion to a front pillar.

With the curtain air bag system according to this aspect, if the vehicle ends up rolling over, the main deployment portion receives a supply of gas and consequently inflates and deploys in a curtain shape. Also, the auxiliary deployment portion inflates and deploys by receiving a supply of gas from this main deployment portion via the gas passage. The head of an occupant seated in the front seat is protected against a rollover by the main deployment portion and the auxiliary deployment portion. Here, with the curtain air bag system described above, the upper end portion of the auxiliary deployment portion is connected to the front pillar via the connecting portion. Therefore, it is possible to prevent or effectively suppress the upper end of the auxiliary deployment portion from becoming offset in the vehicle width direction with respect to the front pillar when protecting the head of an occupant, which improves occupant head protection performance forward of the seat.

In this way, the curtain air bag described above enables occupant head protection performance when the vehicle rolls over to be improved.

In the curtain air bag system described above, the connecting portion may be arranged above an impacting point of an impactor in a rollover test, in the auxiliary deployment portion.

With this curtain air bag system, the auxiliary deployment portion is connected to the front pillar above an impacting point of an impactor in a rollover test, i.e., a position assumed to be the position where the head of the occupant will strike when a rollover occurs, so there is very little, if any, longitudinal offset between the head protecting area when a rollover occurs and the position where the auxiliary deployment portion is fixed to the front pillar by the connecting portion. Therefore, the upper end of the auxiliary deployment portion is prevented, or more effectively suppressed, from becoming offset in the vehicle width direction with respect to the front pillar when protecting the head, which further improves occupant head protection performance forward of the seat.

In the curtain air bag system described above, the auxiliary deployment portion may deploy such that an upper end side thereof, when viewed from a side, overlaps with the front pillar.

With this curtain air bag system, the upper end side of the auxiliary deployment portion is deployed overlapping with the front pillar when viewed from the side, so displacement of the head of the occupant toward the outside in the vehicle width direction can be suppressed at least at the beginning of a rollover, which contributes to better occupant head protection performance forward of the seat.

The curtain air bag system described above may also include a plurality of fixing portions that fix the portion on the upper end side of the main deployment portion to the upper edge portion of the opening for getting into and out of the vehicle in the vehicle body. Also, the plurality of fixing portions may each be arranged above an impacting point of an impactor in a rollover test, in the main deployment portion.

With this curtain air bag system, the main deployment portion is connected to the front pillar above an impacting point of an impactor in a rollover test, i.e., a position assumed to be the position where the head of the occupant will strike when a rollover occurs, so there is very little, if any, longitudinal offset between the position where the main deployment portion is fixed to the front pillar and the head protecting area when a rollover occurs. Therefore, when the head of an occupant seated in the front seat is protected by the main deployment portion, the upper end of the main deployment portion is prevented, or effectively suppressed, from becoming offset in the vehicle width direction with respect to the front pillar, which further improves the occupant head protection performance.

In the curtain air bag system described above, the auxiliary deployment portion may deploy in a cylindrical shape having a center axis in a vertical direction.

With this curtain air bag system, the auxiliary deployment portion that is communicated with the main deployment portion via the gas passage deploys in a cylindrical shape having a center axis in the vertical direction. As a result, the auxiliary deployment portion generates a large reaction force as the head of the occupant is protected when a rollover occurs, thereby enabling displacement of the head of the occupant toward the outside in the vehicle width direction to be suppressed, which contributes to better occupant head protection performance forward of the seat.

As described above, the curtain air bag according to the invention is extremely effective for improving occupant protection performance when a vehicle rolls over.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a side view, as viewed from the inside of the vehicle cabin, of the general overall structure of a curtain air bag system according to a third example embodiment of the invention.

DETAILED DESCRIPTION OF EMBODIMENTS

Figure 1:
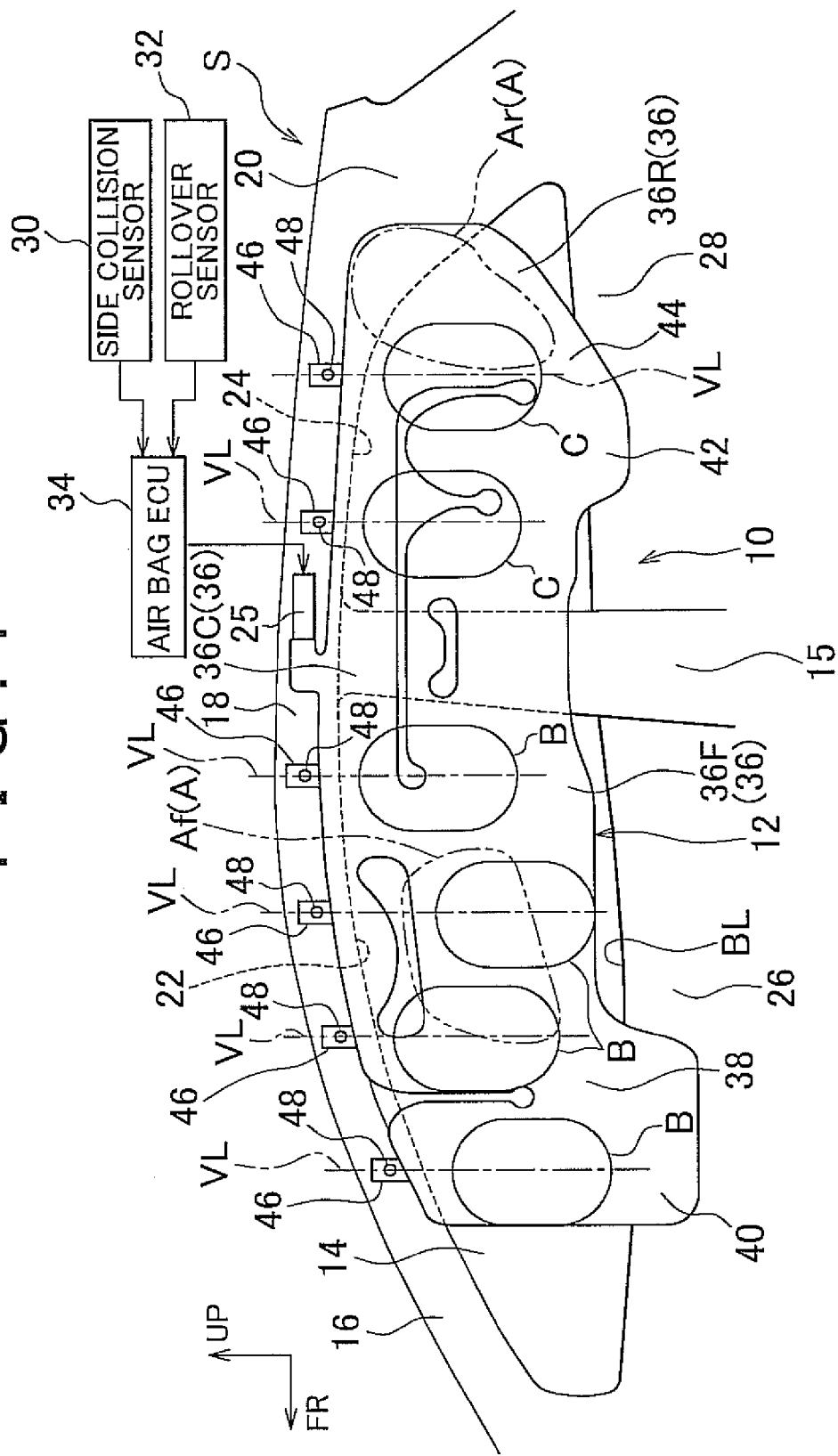
FIG. 1 is a side view, as viewed from the inside of a vehicle cabin, of the general overall structure of a curtain air bag system according to a first example embodiment of the invention.

A curtain air bag system 10 according to a first example embodiment of the invention will now be described with reference to FIGS. 1 to 3. The arrows FR, UP, IN, and OUT shown as appropriate in the drawings indicate the directions front (i.e., advancing), up, inside in the vehicle width direction, and outside in the vehicle width direction, respectively, with respect to a vehicle S to which the curtain air bag system 10 has been applied. Hereinafter, in descriptions using simply the longitudinal and vertical directions, these will be indicated as front or back in the longitudinal direction of the vehicle and up or down in the vertical direction of the vehicle, unless otherwise specified.

Figure 2:
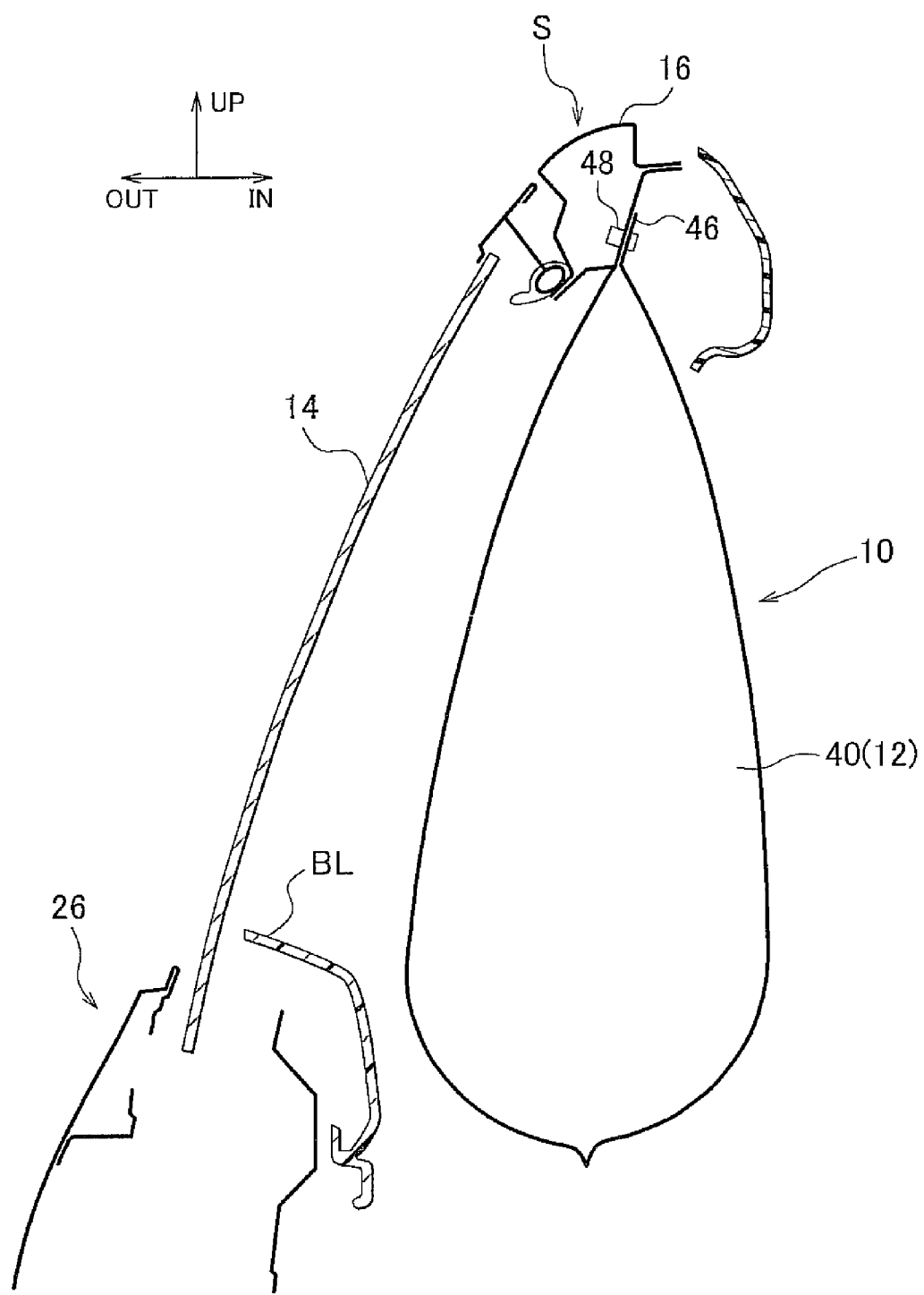
FIG. 2 is an enlarged front view of a deployed state of a front auxiliary chamber that forms part of the curtain air bag system according to the first example embodiment of the invention.

FIG. 1 is a side view, as viewed from inside the vehicle cabin, of the vehicle S to which the curtain air bag system 10 has been applied. As shown in the drawing, the curtain air bag system 10 includes a curtain air bag 12. The curtain air bag 12 is formed so as to deploy in the shape of a curtain along a side window glass 14 and a center pillar (B-pillar) 15 that serve as the inside portion of the vehicle cabin. In this example embodiment, the curtain air bag 12 is structured so as to cover the front and back side window glass 14 positioned next to a front seat and a back seat.

Although not shown, the curtain air bag 12 is housed rolled up or folded up accordion style, for example, in a long shape, from a front pillar (A-pillar) 16 to near a rear pillar 20 along a roof side portion 18. In a predetermined case that will be described later, the curtain air bag 12 will protect the head of an occupant seated in a front seat or a back seat by deploying along the front and back side window glass 14 and center pillar 15, as shown in FIG. 1. The roof side portion 18 in this example embodiment forms an upper edge of front and back door openings 22 and 24 that serve as openings for getting into and out of the vehicle that are surrounded by the roof side portion 18, the front pillar 16, the center pillar 15, and the rear pillar 20. The curtain air bag 12 is housed between a roof side rail and a roof headlining that form the roof side portion 18. The roof side portion 18 may serve as an upper edge portion of an opening for getting into and out of the vehicle, of the invention, and the door openings 22 and 24 may serve as openings for getting into and out of the vehicle, of the invention.

Also, the curtain air bag system 10 includes an inflator 25 for supplying gas into the curtain air bag 12. The inflator 25 is a combustion type inflator or a cold gas type inflator, and supplies gas produced when activated into the curtain air bag 12. A gas injection port of the inflator 25 is communicated with the inside of the curtain air bag 12. In this example embodiment, the inflator 25 is arranged in the roof side portion 18. The shape of the curtain air bag 12 when deployed (i.e., the deployed shape) and the arrangement of the inflator 25 will be described later.

The curtain air bag 12 and the inflator 25 described above are each provided on both sides of in the vehicle width direction of the vehicle S. That is, the curtain air bag system 10 includes a pair of one curtain air bag 12 and one inflator 25 on both the left and right sides. Furthermore, the curtain air bag system 10 includes an air bag ECU 34 that is electrically connected to both a side collision sensor 30 and a rollover sensor 32, as shown in FIG. 1. The side collision sensor 30 predicts or detects (the inevitability of) a side collision of the vehicle S, and outputs a side collision detection signal to the air bag ECU 34. The rollover sensor 32 predicts or detects (the inevitability of) a rollover of the vehicle S, and outputs a rollover detection signal (hereinafter simply referred to as an "R/O detection signal") to the air bag ECU 34.

Although only the connection with one inflator 25 is shown in FIG. 1, the air bag ECU 34 is electrically connected to both the left and right inflators 25. Upon receiving a side collision detection signal, the air bag ECU 34 activates the inflator 25 on the side of the side collision (i.e., the near side). Therefore, when the vehicle S is collided with in a side collision, the curtain air bag 12 on the near side receives a supply of gas, and consequently inflates and deploys. Also, upon receiving an R/O detection signal, the air bag ECU 34 activates the inflator 25 on both sides in the vehicle width direction. Upon receiving an R/O detection signal after a side collision, the air bag ECU 34 activates the inflator 25 on the side opposite the side collision side that is already activated.

Hereinafter, the structure of the curtain air bag 12 will be described in detail. Unless otherwise specified, the structure (i.e., shape) of the curtain air bag 12 when inflated and deployed will be described. As shown in FIG. 1, the curtain air bag 12 includes a main chamber 36 that serves as a main deployment portion, a front auxiliary chamber 40 that serves as an auxiliary deployment portion that is communicated with the main chamber 36, and a rear auxiliary chamber 42 that is communicated with the main chamber 36. The main chamber 36 may serve as a main deployment portion of the invention, and the front auxiliary chamber 40 may serve as an auxiliary deployment portion of the invention.

The main chamber 36 inflates and deploys in an area where the head is protected against a side collision (see area A in FIG. 1). More specifically, the main chamber 36 includes a front main chamber 36F, a rear main chamber 36R, and a gas supply passage 36C. The front main chamber 36F inflates and deploys so as to cover an area that includes an area Af for the front seat where the head is protected against a side collision.

The rear main chamber 36R inflates and deploys so as to cover an area that includes an area Ar for the back seat where the head is protected against a side collision. The gas supply passage 36C communicates the front main chamber 36F with the rear main chamber 36R along the roof side portion 18.

The inflator 25 supplies gas from a substantially center portion of the gas supply passage 36C. That is, the inflator 25 is arranged between the front main chamber 36F that is the front portion of the curtain air bag 12 and the rear main chamber 36R that is the rear portion of the curtain air bag 12. The inflator 25 may also be arranged in the center pillar 15 or the rear pillar 20.

The front auxiliary chamber 40 deploys forward of the front main chamber 36F and forms a front end portion of the curtain air bag 12 that protects the head of an occupant seated in the front seat, forward of the front seat, when a rollover occurs. When viewed from the side, the upper end side of the front auxiliary chamber 40 overlaps with the front pillar 16, and the lower end side of the front auxiliary chamber 40 is positioned below a beltline BL and overlaps with the front portion of a front side door 26 that serves as a side door. The front side door 26 may serve as a side door of the invention.

In this example embodiment, the lower portion (i.e., a portion in the vertical direction) of the front auxiliary chamber 40 is communicated with a front end lower portion of the front main chamber 36F via a gas passage 38 that can be regarded as a narrowed portion of the curtain air bag 12. As shown in FIG. 2 that is a front view, the front auxiliary chamber 40 deploys in a generally (long vertical) cylindrical shape having a center axis in the vertical direction.

Here, regions B shown by the thin solid lines in FIG. 1 indicate test points (i.e., impacting points or striking points) corresponding to the head of an occupant at the front seat that are struck by an impactor I (see FIG. 3) in a rollover test (FMVSS No. 226). With the curtain air bag 12, the front-most test point in the rollover test is covered by this front auxiliary chamber 40. The other test points with respect to an occupant seated in the front seat in the rollover test are covered by the front main chamber 36F. At this front-most test point, the upper end side engages with (i.e., abuts against) the front pillar 16, and the lower end side engages with (i.e., abuts against) the front side door 26, such that displacement of the head of the occupant toward the outside in the vehicle width direction when a rollover occurs is suppressed.

The rear auxiliary chamber 42 deploys forward of the rear main chamber 36R, and forms a portion between the rear main chamber 36R and the front main chamber 36F. In this example embodiment, a portion on the lower end side of the rear auxiliary chamber 42 is communicated with a front lower portion of the rear main chamber 36R via a gas passage 44. Also, a front end of the rear auxiliary chamber 42 in this example embodiment is communicated with a rear end portion of the front main chamber 36F.

Further, the upper end side of the rear auxiliary chamber 42 is joined (i.e., connected) to a lower edge portion of the gas supply passage 36C, and the lower end side of the rear auxiliary chamber 42 deploys overlapping with the rear side door 28. Thus, the rear auxiliary chamber 42 protects the head of an occupant seated in the back seat, forward of the back seat, when a rollover occurs.

More specifically, regions C shown by the thin solid lines in FIG. 1 indicates test points (i.e., striking points) at the back seat that are struck by the impactor I in a rollover test (FMVSS No. 226). With the curtain air bag 12, the front-most test point at the back seat in the rollover test is covered by the rear auxiliary chamber 42. At this front-most test point, the lower end side of the rear auxiliary chamber 42 that is communicated at the upper end with the gas supply passage 36C engages with (i.e., abuts against) the rear side door 28, thereby suppressing displacement of the head of the occupant toward the outside in the vehicle width direction when a rollover occurs. A rear-most test point with respect to a driver seated in the front seat in the rollover test (an intermediate test point is not shown in FIG. 1) is covered by the rear main chamber 36R and the rear auxiliary chamber 42.

The front end of the curtain air bag 12, i.e., the front auxiliary chamber 40, is supported by the front pillar 16 via a tension cloth, not shown. Also, the rear end of the curtain air bag 12, i.e., the rear main chamber 36R, is supported by the rear pillar 20 via a tension cloth, also not shown.

Next, attachment of the curtain air bag 12 described above to the vehicle body will be described. As shown in FIG. 1, a plurality of attaching strips 46 are provided along the upper edge of the curtain air bag 12. The attaching strips 46 of the curtain air bag 12 are fixed to the vehicle body frame (i.e., the front pillar 16, the roof side portion 18, and the rear pillar 20) by fixing implements 48 such as clips or nuts and bolts that pass through the attaching strips 46. The curtain air bag 12 is attached to the vehicle body via the plurality of attaching strips 46. Of the plurality of attaching strips 46 and fixing implements 48, the front-most attaching strip 46 and fixing implement 48 that connect the front auxiliary chamber 40 to the front pillar 16 may serve as a connecting portion of the invention, and the remaining attaching strips 46 and fixing implements 48 may serve as a fixing portion of the invention.

Also, with the curtain air bag system 10, the front-most attaching strip 46 is arranged above a test point (region B) of the front auxiliary chamber 40. More specifically, fixing point (the fixing implement 48) where the attaching strip 46 is fixed to the front pillar 16 is arranged on a vertical line VL that passes through the longitudinal center of the region B.

Also, in this example embodiment, the attaching strips 46 on the upper side of the front main chamber 36F are arranged above the test points (i.e., regions B) of the front main chamber 36F. That is, the fixing points (i.e., the fixing implements 48) where the attaching strips 46 are fixed to the roof side portion 18 are arranged on or near vertical lines VL that pass through the longitudinal centers of the regions B.

Moreover, in this example embodiment, the attaching strips 46 on the upper side of the rear main chamber 36R are arranged at least above the front-most and rear-most test points (i.e., regions C) of the rear main chamber 36R. That is, the fixing points (i.e., the fixing implements 48) where the attaching strips 46 are fixed to the roof side portion 18 are arranged on or near vertical lines VL that pass through the longitudinal centers of the regions C.

With the attaching strips 46 on the upper side of the main chamber 36, some attaching strips 46 may be arranged longitudinally offset with respect to the test points due to restrictions from assist grips or the like being attached, for example.

Next, the operation of the first example embodiment will be described.

With the curtain air bag system 10 having the structure described above, when a side collision occurs with respect to the vehicle S to which the curtain air bag system 10 is applied, the air bag ECU 34 that receives a side collision detection signal from the side collision sensor 30 activates the inflator 25 on the side where the side collision has occurred. Accordingly, the curtain air bag 12 receives a supply of gas from the inflator 25 and inflates, such that the main chamber 36, the front auxiliary chamber 40, and the rear auxiliary chamber 42 of the curtain air bag 12 deploy. As a result, the head of an occupant on the side collision side is protected by the main chamber 36 of the curtain air bag 12.

Also, if the vehicle S rolls over after a side collision, the air bag ECU 34 that receives a R/O detection signal from the rollover sensor 32 activates the inflator 25 on the side opposite the side collision side. On the other hand, if the vehicle S rolls over independent of a side collision, the air bag ECU 34 that receives a R/O detection signal from the rollover sensor 32 activates the inflator 25 on both the left and right sides of the vehicle. As a result, the curtain air bag 12 will deploy on both sides in the vehicle width direction, so the head of the occupant will be protected against a rollover.

Figure 3:
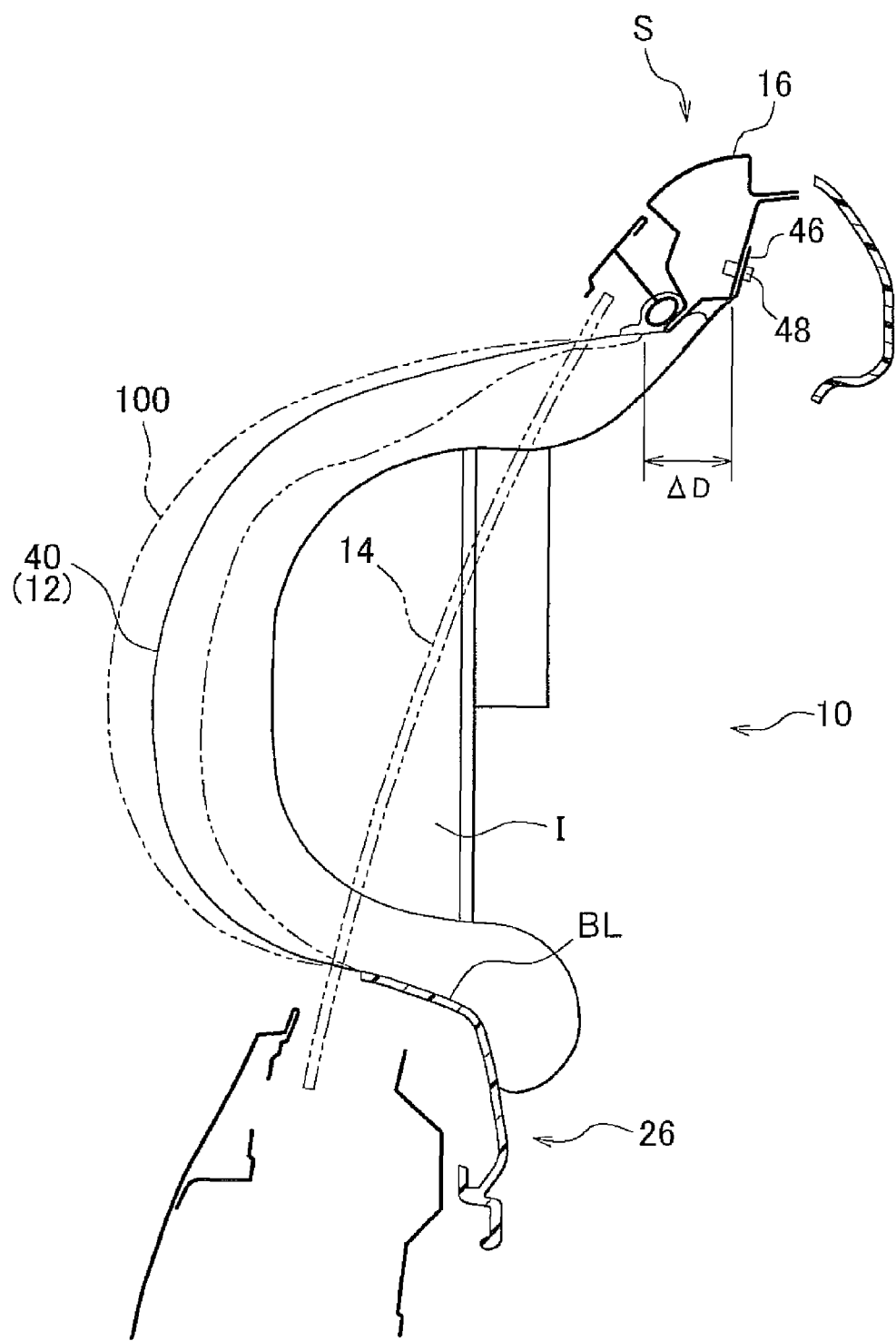
FIG. 3 is a front view showing a frame format of a head protecting state by the front auxiliary chamber that forms part of the curtain air bag system according to the first example embodiment of the invention.

Here, when the head of an occupant is protected by the front auxiliary chamber 40 when a rollover occurs, the front auxiliary chamber 40 of which the lower end side overlaps with the front side door 26 suppresses the head (i.e., the impactor I) from being displaced toward the outside in the vehicle width direction by the lower end portion of the front auxiliary chamber 40 engaging with (abutting against) the front side door 26, as shown in FIG. 3. In particular, the front auxiliary chamber 40 deploys with the upper end side thereof overlapping with the front pillar 16, so when first protecting the head of an occupant when a rollover occurs, the front auxiliary chamber 40 even more effectively suppresses the head (i.e., the impactor I) from being displaced toward the outside in the vehicle width direction by the upper end side of the front auxiliary chamber 40 engaging with (abutting against) the front pillar 16.

Also, with the curtain air bag system 10, the upper portion of the front auxiliary chamber 40 is fixed to the front pillar 16 via the attaching strips 46, which makes it possible to prevent or effectively suppress the upper portion of the front auxiliary chamber 40 from becoming offset toward the outside in the vehicle width direction when protecting the head of an occupant. For example, with a front auxiliary chamber 100 according to a comparative example in which the attaching strips 46 are not provided on the upper portion, the overall amount of displacement of the front auxiliary chamber 100 toward the outside in the vehicle width direction is large, as shown by the virtual line in FIG. 3, when the front auxiliary chamber 100 is offset.

In contrast, with the curtain air bag system 10, the upper portion of the front auxiliary chamber 40 is fixed (i.e., connected) to the front pillar 16 via the attaching strips 46 as described above, so the amount of displacement of the upper end toward the outside in the vehicle width direction is less than it is with the front auxiliary chamber 100 according to the comparative example by an amount ΔD. Therefore, the front auxiliary chamber 40 is prevented or suppressed from becoming offset by the amount ΔD, so the occupant head protection performance forward of the front seat is improved. In a comparative test with the comparative example, the amount of travel of the impactor I in the vehicle width direction was confirmed to be suppressed approximately 100 mm compared with when the fixing implements 48 and the attaching strips 46 on the front auxiliary chamber 40 were not provided.

In this way, the curtain air bag system 10 according to the first example embodiment enables the occupant protection performance when the vehicle rolls over to be improved.

In particular, the attaching strips 46 are arranged above (directly above) the test points in the rollover test, so there is very little, if any, longitudinal offset between the head protecting area when a rollover occurs and the position where the front auxiliary chamber 40 is fixed to the front pillar 16 via the attaching strips 46. Therefore, when the head is protected by the front auxiliary chamber 40 when a rollover occurs, the upper end of the front auxiliary chamber 40 is prevented, or more effectively suppressed, from becoming offset toward the outside in the vehicle width direction with respect to the front pillar 16, thus further improving the occupant head protection performance forward of the front seat. In a comparative test that compared a case in which the attaching strips 46 and fixing implements 48 of the front auxiliary chamber 40 were offset with respect to the structure (i.e., the vertical lines VL) of this example embodiment, it was confirmed that the amount of travel of the impactor I in the vehicle width direction is suppressed approximately 10 mm.

Furthermore, the attaching strips 46 above the main chamber 36 are also arranged above (directly above) the test points in the rollover test, so there is very little, if any, longitudinal offset between the head protecting area when a rollover occurs and the position where the main chamber 36 is fixed to the roof side portion 18. Therefore, when the head is protected by the main chamber 36 and/or the rear auxiliary chamber 42 when a rollover occurs, the upper end of the main chamber 36 is prevented, or more effectively suppressed, from becoming offset toward the outside in the vehicle width direction with respect to the roof side portion 18, thus further improving the occupant head protection performance.

Also, here, with the curtain air bag system 10, the front auxiliary chamber 40 that is communicated with the main chamber 36 via the gas passage 38 deploys in a cylindrical shape having a center axis in the vertical direction. In other words, the front auxiliary chamber 40 deploys as a separate deployment portion from the main chamber 36. Therefore, a large reaction force is generated as the head of the occupant is protected by the front auxiliary chamber 40 when a rollover occurs, which enables displacement of the head of the occupant toward the outside in the vehicle width direction to be suppressed, while an increase in the volume of the overall curtain air bag 12 is able to be suppressed. That is, this structure contributes to an improvement in occupant head protection performance forward of the seat.

Next, another example embodiment of the invention will be described. In the description below, structure that is basically the same as structure in the first example embodiment or otherwise described above will be denoted by the same reference characters used for the structure in the earlier description, and descriptions and illustrations thereof may be omitted.

Figure 4:
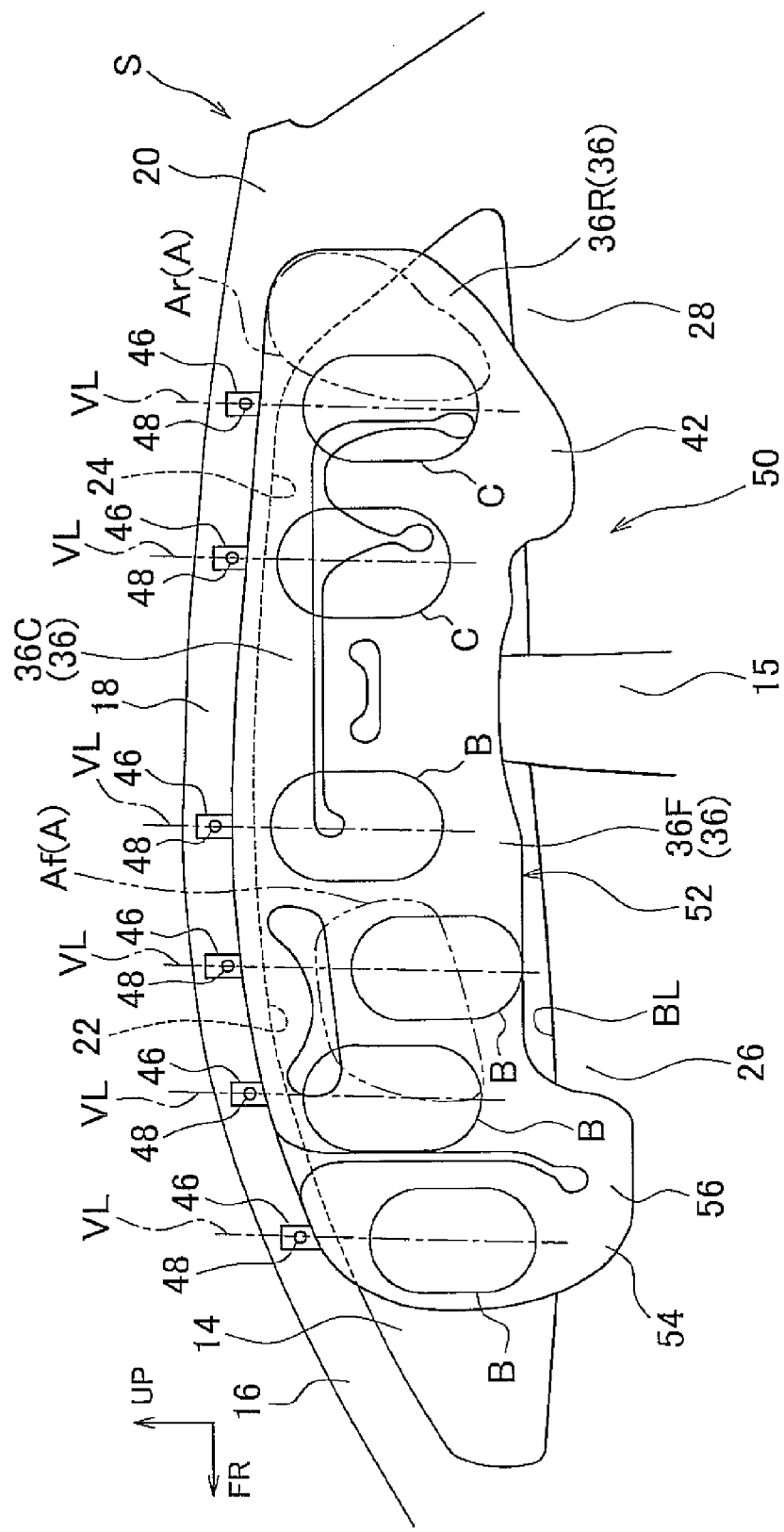
FIG. 4 is a side view, as viewed from the inside of the vehicle cabin, of the general overall structure of a curtain air bag system according to a second example embodiment of the invention.

FIG. 4 is a side view corresponding to FIG. 1, of a curtain air bag 52 in a curtain air bag system 50 according to a second example embodiment of the invention. In FIG. 4, the inflator 25 and the air bag ECU 34 and the like are omitted. As shown in FIG. 4, the curtain air bag 52 differs from the curtain air bag 12 in that it includes a front auxiliary chamber 54 and a gas passage 56 that is communicated with a lower end portion of this front auxiliary chamber 54, instead of the front auxiliary chamber 40 and the gas passage 38 that is communicated with the lower portion of the front auxiliary chamber 40.

The front auxiliary chamber 54 deploys such that the front end thereof is in a position farther forward than the front end of the front auxiliary chamber 40 (region B) in the first example embodiment. The gas passage 56 forms a general L-shape that extends downward and forward from the front lower portion of the front main chamber 36F, so as to communicate with the lower end portion of the front auxiliary chamber 54 that deploys below the beltline BL. In other words, the gas passage 56 also may be regarded as a portion that doubles as a portion of the front auxiliary chamber 54 that deploys overlapping with the front side door 26. Also, although not shown, the front auxiliary chamber 54 deploys in a generally cylindrical shape having a center axis in the vertical direction.

Accordingly, the front auxiliary chamber 54 has a slightly larger volume than the front auxiliary chamber 40 of the first example embodiment, but the gas passage 56 has a smaller volume than the gas passage 38, so the total volume of the curtain air bag 52 is equivalent to the total volume of the curtain air bag 12. The other structure of the curtain air bag system 50, including portions not shown, is basically the same as the corresponding structure of the curtain air bag system 10.

Therefore, with the curtain air bag system 50 according to the second example embodiment as well, a similar effect can be obtained by basically the same operation as that of the curtain air bag system 10 according to the first example embodiment.

FIG. 5 is a side view that corresponds to FIG. 1, of a curtain air bag 62 in a curtain air bag system 60 according to a third example embodiment of the invention. In FIG. 5, the inflator 25 and the air bag ECU 34 and the like are omitted. As shown in FIG. 5, the curtain air bag 62 differs from the curtain air bag system 12 in that it includes a front auxiliary chamber 64 and a gas passage 66 that is communicated with a lower end portion of this front auxiliary chamber 64, instead of the front auxiliary chamber 40 and the gas passage 38 that is communicated with the lower portion of the front auxiliary chamber 40.

The front auxiliary chamber 64 deploys such that the front end thereof is in a position farther forward than the front end of the front auxiliary chamber 40 (region B) in the first example embodiment. The gas passage 66 extends forward from the front upper portion of the front main chamber 36F to communicate with the upper end portion that includes a portion of the front auxiliary chamber 64 that deploys overlapping with the front pillar 16. Also, although not shown, the front auxiliary chamber 64 deploys in a generally cylindrical shape having a center axis in the vertical direction.

Accordingly, the front auxiliary chamber 64 has a slightly larger volume than the front auxiliary chamber 40, but the gas passage 66 has a smaller volume than the gas passage 38, so the total volume of the curtain air bag 62 is equivalent to the total volume of the curtain air bag 12. Also, the curtain air bag 62 differs from the curtain air bag 12 in that the front end of the rear auxiliary chamber 42 is only connected to, not communicated with, the front main chamber 36F. The other structure of the curtain air bag system 60, including portions not shown, is basically the same as the corresponding structure of the curtain air bag system 10.

Therefore, with the curtain air bag system 60 according to the third example embodiment as well, a similar effect can be obtained by basically the same operation as that of the curtain air bag system 10 according to the first example embodiment.

In the example embodiments described above, the invention is described as being applied to the vehicle S provided with a back seat and the rear side door 28, but the invention is not limited to this. For example, the invention may also be applied to a two-door vehicle that has no rear side door 28, a two-seat vehicle that has no back seat, or a vehicle that has three or more rows of seats, or the like.

Also, in the example embodiments described above, the front auxiliary chambers 40, 54, and 64 are configured to receive a supply of gas from the main chamber 36 via the main chamber 36 and the gas passage 38, 56, and 66, but the invention is not limited to this. For example, when a gas passage (including a case in which the gas passage is a tube or the like that is separate from the curtain air bag 12) that distributes gas from an inflator to the front main chamber 36F and the rear main chamber 36R is provided, gas may also be supplied to the front auxiliary chamber 40 and the like from this gas passage (not via the main chamber 36).

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A curtain air bag system comprising:
a main deployment portion for an occupant seated in a front seat, the main deployment portion is housed folded up in an upper edge portion of an opening for getting into and out of a vehicle in a vehicle body, and the main deployment portion inflates by receiving a supply of gas when the vehicle is collided with in a side collision as well as when the vehicle rolls over, and the main deployment portion deploys in a curtain shape downward with respect to the vehicle;
an auxiliary deployment portion that inflates by receiving a supply of gas via a gas passage that is in communication with a portion of the auxiliary deployment portion in a vertical direction of the vehicle, and the auxiliary deployment portion deploys in a cylindrical shape having a center axis in the vertical direction such that a lower end side, when viewed from a side, overlaps with a side door forward of the main deployment portion; and
a connecting portion that connects a portion on an upper end side of the auxiliary deployment portion to a front pillar, the connecting portion arranged on a vertical line that passes through a longitudinal center of a front-most impacting point of an impactor in a rollover test under FMVSS No. 226;
a plurality of fixing portions that fix a portion on an upper end side of the main deployment portion to the upper edge portion of the opening for getting into and out of the vehicle in the vehicle body, the plurality of fixing portions being respectively arranged on vertical lines that pass through longitudinal centers of a plurality of remaining impacting points of the impactor in the rollover test under FMVSS No. 226, and the plurality of the remaining impacting points being different from the front-most impacting point of the impactor under FMVSS No. 226.

2. The curtain air bag system according to claim 1, wherein the connecting portion is arranged above the impacting point of the impactor in the rollover test, in the auxiliary deployment portion.

3. The curtain air bag system according to claim 1, wherein the auxiliary deployment portion is connected to the front pillar above a position estimated to be a position where a head of the occupant will strike when a rollover occurs.

4. The curtain air bag system according to claim 1, wherein the auxiliary deployment portion deploys such that the upper end side thereof, when viewed from the side, overlaps with the front pillar.

5. The curtain air bag system according to claim 1, wherein the gas passage doubles as a portion of the auxiliary deployment portion that deploys overlapping with the side door.

6. The curtain air bag system according to claim 1, a lower portion of the auxiliary deployment portion is communicated with a front end lower portion of the main deployment portion via the gas passage that is regarded as a narrowed portion of the curtain air bag.

7. The curtain air bag system according to claim 1, the lower end portion of the auxiliary deployment portion that deploys below a beltline is communicated with the front end lower portion of the main deployment portion via the gas passage formed in a general L-shape that extends downward and forward from the front end lower portion of the main deployment portion.

8. The curtain air bag system according to claim 1, the upper end portion of the auxiliary deployment portion that includes a portion that deploys overlapping with the front pillar is communicate with the front upper portion of the main deployment portion via the gas passage that extends forward from a front end upper portion of the main deployment portion.

9. The curtain air bag system according to claim 1, the auxiliary deployment portion separated from the main deployment portion by a channel extending in a generally vertical direction, the gas passage positioned along one of the lower end side and opposite upper end side of the auxiliary deployment portion and the channel extending vertically from the other of the lower end side and the upper end side.

10. The curtain air bag system according to claim 1, wherein the auxiliary deployment portion is a forwardmost portion of the curtain air bag system.

11. A curtain air bag system comprising:
a main deployment portion for an occupant seated in a front seat, the main deployment portion is housed folded up in an upper edge portion of an opening for getting into and out of a vehicle in a vehicle body, and the main deployment portion inflates by receiving a supply of gas when the vehicle is collided with in a side collision as well as when the vehicle rolls over, and the main deployment portion deploys in a curtain shape downward with respect to the vehicle;
an auxiliary deployment portion that inflates as a front-most portion of the curtain air bag system by receiving a supply of gas via a gas passage that is in communication with a portion of the auxiliary deployment portion in a vertical direction of the vehicle, and the auxiliary deployment portion deploys in a cylindrical shape having a center axis in the vertical direction such that a lower end side, when viewed from a side, overlaps with a side door forward of the main deployment portion, a lower portion of the auxiliary deployment portion is communicated with a front end lower portion of the main deployment portion via the gas passage that is regarded as a narrowed portion of the curtain air bag system; and
a connecting portion that connects a portion of an upper end side of the auxiliary deployment portion to a front pillar, the connecting portion is arranged on a vertical line that passes through a longitudinal center of an impacting point of an impactor in a rollover test, the connecting portion being a front-most connecting portion.

12. The curtain air bag system according to claim 11, wherein the connecting portion is arranged above the impacting point of the impactor in the rollover test, in the auxiliary deployment portion.

13. The curtain air bag system according to claim 11, wherein the auxiliary deployment portion is connected to the front pillar above a position estimated to be a position where a head of the occupant will strike when a rollover occurs.

14. The curtain air bag system according to claim 11, wherein the auxiliary deployment portion deploys such that the upper end side thereof, when viewed from the side, overlaps with the front pillar.

15. The curtain air bag system according to claim 11, further comprising:
a plurality of fixing portions that fix a portion on the upper end side of the main deployment portion to the upper edge portion of the opening for getting into and out of the vehicle in the vehicle body,
wherein the plurality of fixing portions are each arranged above the impacting point of the impactor in the rollover test, in the main deployment portion.

16. The curtain air bag system according to claim 11, wherein the gas passage doubles as a portion of the auxiliary deployment portion that deploys overlapping with the side door.

17. The curtain air bag system according to claim 11, the lower portion of the auxiliary deployment portion is communicated with the front end lower portion of the main deployment portion via the gas passage that is regarded as a narrowed portion of the curtain air bag.

18. The curtain air bag system according to claim 11, the lower end portion of the auxiliary deployment portion that deploys below a beltline is communicated with the front end lower portion of the main deployment portion via the gas passage formed in a general L-shape that extends downward and forward from the front end lower portion of the main deployment portion.

19. The curtain air bag system according to claim 11, the auxiliary deployment portion separated from the main deployment portion by a channel extending in a generally vertical direction, the gas passage positioned along one of the lower end side and opposite upper end side of the auxiliary deployment portion and the channel extending vertically from the other of the lower end side and the upper end side.

* * * * *